B. Merritt, Jr.
Fish Net.

N° 20,725. Patented June 29, 1858.

United States Patent Office.

BENJ. MERRITT, JR., OF BOSTON, MASSACHUSETTS.

NET FOR CATCHING FISH AT SEA.

Specification forming part of Letters Patent No. 20,725, dated June 29, 1858.

*To all whom it may concern:*

Be it known that I, BENJAMIN MERRITT, Jr., late of Boston, in the county of Suffolk, but now of Charlestown, in the county of Middlesex and State of Massachusetts, have invented a new and useful Mode of Taking Fish at Sea; and I do hereby declare that the same is fully described and represented in the following specification and the accompanying drawings, of which—

Figure 1:
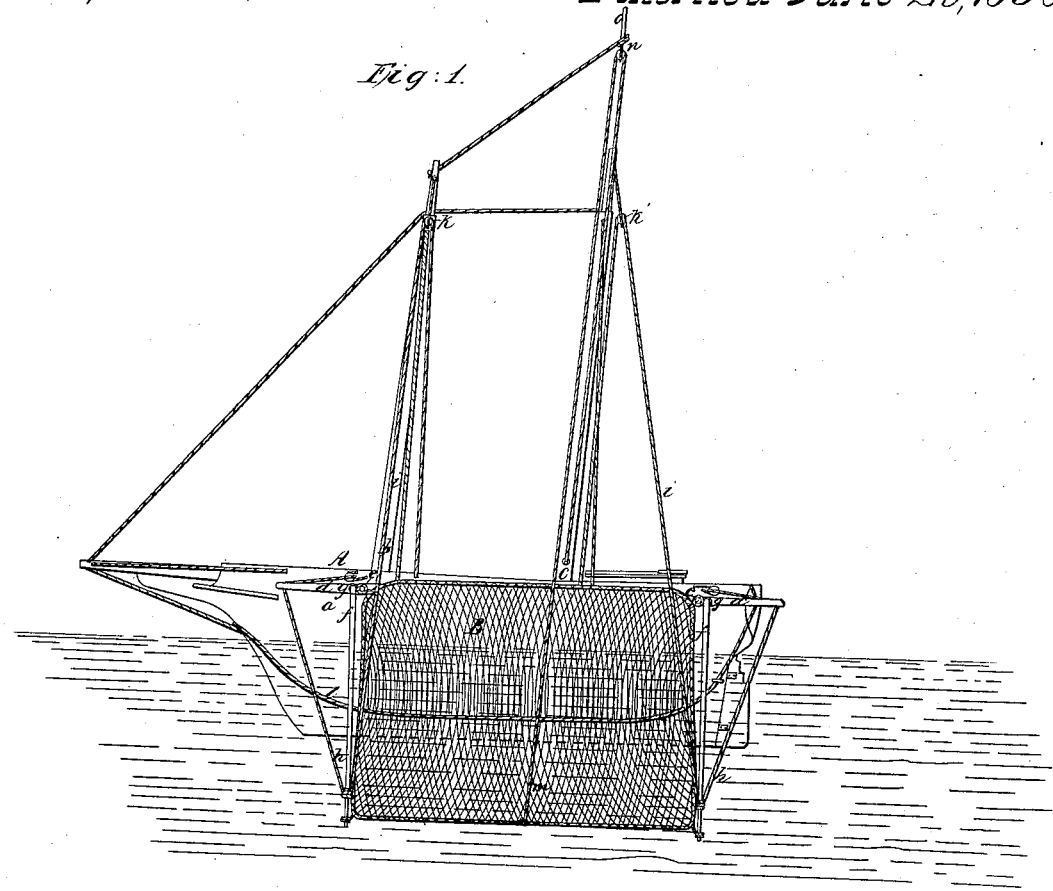
Figure 2:
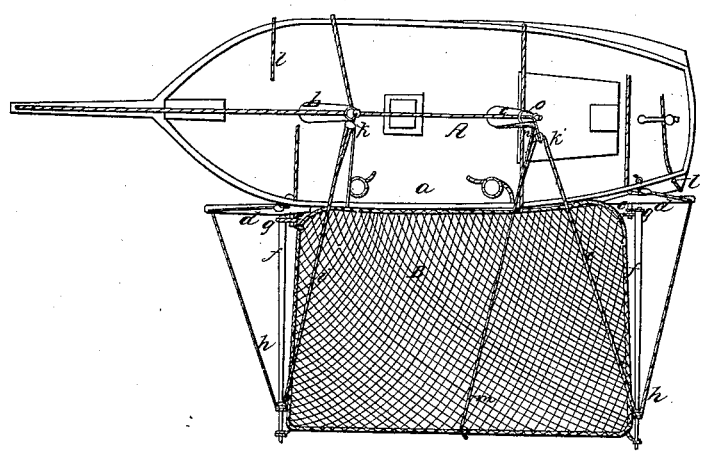

Figure 1 denotes a side elevation of a schooner or vessel having my invention applied to it, the booms of the folding net being therein exhibited as projecting downward and standing in vertical positions. Fig. 2 is a top view, in which the booms are shown as elevated into horizontal or nearly horizontal positions.

In such drawings, A exhibits the vessel, of which $a$ is the hull, $b$, the foremast, and $c$ the mainmast.

On one side of the hull, and near the bulwark-rail, two sprits or arms are extended in opposite directions, as shown at $d\,d$. From each strut, near its heel or inner end, a bolt, $e$, projects, which has the heel of a boom, $f$, connected to it by a rope or connection, $g$, of such nature as will allow the boom to be moved either upward, downward, or laterally, the connection operating in such respects as a universal joint. Each of the booms $f$ has two sets of hauling-tackle applied to it, they being shown at $h$ and $i$. That marked $h$ extends from the boom near its outer end to and through the outer end of the adjacent sprit $d$, and thence along the sprit toward the stay of the mast, and serves to extend the net when attached to the booms. That marked $i$ extends from the same part of the boom up to or near to the mast-head, where it is attached, the down-haul being carried down to the bulwarks, as shown in the drawings. The block $k$ of one of the lifting-tackles $i\,i$ is suspended from the head of the foremast, while that— viz., $k'$—of the other is similarly suspended from the mainmast-head.

The object of the tackles $i\,i$ is to enable the booms and the net to be sprung or moved so as to catch fish and either deposit them on the deck of the vessel or so raise them out of the water as to enable the fisherman to readily remove them from the net.

Attached by one edge to the side of the vessel, and by its two ends or outer corners to the booms, is a scoop-net, B, its ends being semicircular in form. A brail or line, $l$, is attached to the net along its middle or at any other proper part, and is carried around the bow and stern of the hull in such manner as to enable the slack of the net to be drawn up against the side or bottom of the hull. This line is to be cast loose preparatory to the springing of the net on a shoal of fish.

Furthermore, another hauling-tackle, $m$, may be attached to the middle part of the outer edge of the net, and have its pulley $n$ suspended from the main topmast $o$, the object of the same being to raise the middle of the outer edge of the net up, so as to prevent the escape of the fishes.

In preparing the net for taking a shoal of fishes the booms $f\,f$ are to be allowed to hang downward in vertical positions, as shown in Fig. 1. When the fishes are alongside and sufficiently near to the net the lifting-tackles $i\,i$ are to be suddenly and smartly pulled, so as to cause the booms to be moved or turned outward or away from the hull in a manner to carry the net underneath the shoal and catch the fish. By continuing to lift the booms so that they shall stand in vertical positions and above the sprits, the fish may be easily discharged on the deck, particularly if the fisherman lay hold of and lift up the bagging parts of the net. After the fishes have been so taken, the net may be again dropped into the water and into a position ready for being again sprung when a favorable opportunity may occur.

With the above-described appliances to his vessel a fisherman may operate to great advantage. While the net is not in use the booms may be turned around toward each other and against the side of the hull, and the net may be furled or taken on board, so as to be no impediment to the sailing of the vessel.

I claim—

1. Combining a seine or net with the hull of a navigable vessel, substantially in manner and so as to operate therewith as described.

2. The mode of spreading the ends and outer edge of the net—viz., by the booms $f f$, the sprits $d\,d$, and the hauling-tackles $h\,h$, arranged and applied together and to the vessel as specified.

3. The combination of the brailing-line $l$ and the lifting-tackles $i\,i$ and $m$ with the net, its booms, and the masts.

In testimony whereof I have hereunto set my signature.

BENJAMIN MERRITT, Jr.

Witnesses:
R. H. Eddy,
F. P. Hale, Jr.